United States Patent
Kochale et al.

(10) Patent No.: US 8,077,817 B2
(45) Date of Patent: Dec. 13, 2011

(54) ARRANGEMENT FOR ADAPTIVE BIT RECOVERY

(75) Inventors: Axel Kochale, Springe (DE); Dirk Schmitt, Pfaffenweiler (DE); Stefan Rapp, Schramberg (DE)

(73) Assignee: Thomson Licensing, Boulogne-Billancourt (FR)

( * ) Notice: Subject to any disclaimer, the term of this patent is extended or adjusted under 35 U.S.C. 154(b) by 651 days.

(21) Appl. No.: 10/590,555

(22) PCT Filed: Feb. 26, 2005

(86) PCT No.: PCT/EP2005/002070
§ 371 (c)(1),
(2), (4) Date: Aug. 27, 2009

(87) PCT Pub. No.: WO2005/086156
PCT Pub. Date: Sep. 15, 2005

(65) Prior Publication Data
US 2010/0040126 A1  Feb. 18, 2010

(30) Foreign Application Priority Data
Mar. 9, 2004 (EP) .................................... 04005528

(51) Int. Cl.
*H04B 1/10* (2006.01)
(52) U.S. Cl. ........ 375/350; 375/229; 375/232; 375/340; 375/341; 375/346
(58) Field of Classification Search .......... 375/229–236, 375/340–341, 346–350
See application file for complete search history.

(56) References Cited

U.S. PATENT DOCUMENTS

| 5,245,561 | A | * | 9/1993 | Sugiyama | 708/322 |
|---|---|---|---|---|---|
| 5,335,020 | A | * | 8/1994 | Dieterich | 348/614 |
| 5,511,080 | A | * | 4/1996 | Itoi et al. | 714/795 |
| 5,809,406 | A | * | 9/1998 | Taki et al. | 455/135 |
| 5,889,823 | A | | 3/1999 | Agazzi et al. | |
| 5,892,632 | A | | 4/1999 | Behrens et al. | |
| 6,614,841 | B1 | | 9/2003 | Ohta | |

(Continued)

FOREIGN PATENT DOCUMENTS

EP  0 363 551  4/1990

(Continued)

OTHER PUBLICATIONS

Ozeki, K., et al., "An Adaptive Filtering Algorithm Using An Orthogonal Projection To An Affine Subspace And Its Properties", NHK Technical Research Laboratories, Tokyo, Japan 167, Electronics and Communications in Japan, vol. 67-A, No. 5, 1984, pp. 19-27.

(Continued)

*Primary Examiner* — Curtis B Odom
(74) *Attorney, Agent, or Firm* — Robert D. Shedd; Robert B. Levy; Jorge Tony Villabon

(57) ABSTRACT

The present invention relates to an arrangement for adaptive bit recovery, and to an apparatus for reading from and/or writing to recording media using such arrangement. According to the invention, an arrangement for adaptive bit recovery including an adaptive equalizer and an adaptive partial response maximum likelihood detector further includes an overflow control block for the adaptive equalizer for monitoring one or more of the adaptation coefficients and/or a state violation checker for monitoring the allowed states and indicating state violations as well as and a noise detector for detecting larger deviations of the target values.

7 Claims, 7 Drawing Sheets

U.S. PATENT DOCUMENTS

| | | | |
|---|---|---|---|
| 6,937,551 B2 * | 8/2005 | Miyashita et al. | 369/53.16 |
| 7,155,660 B1 * | 12/2006 | Burd | 714/795 |
| 7,394,735 B2 | 7/2008 | Shim et al. | |
| 2004/0133842 A1 * | 7/2004 | Oki | 714/794 |
| 2005/0193318 A1 * | 9/2005 | Okumura et al. | 714/795 |
| 2009/0137912 A1 | 5/2009 | Hirabara et al. | |

FOREIGN PATENT DOCUMENTS

| | | |
|---|---|---|
| EP | 0 805 447 | 11/1997 |
| EP | 1 320 097 | 6/2003 |
| JP | H-08-161832 | 6/1996 |
| JP | 2000-276850 | 10/2000 |
| JP | 2003-123402 | 4/2003 |
| JP | 2003-338134 | 11/2003 |

OTHER PUBLICATIONS

Dittrich, A., et al., "Adaptive Viterbi-Entzerrer für nichtlineare Kanäle", Lucent Technologies Network Systems GmbH, Nürnberg.

Kondo, T., et al., "19.8 GBytes ROM Disc Readout Using A 0.7 NA Single Objective Lens and a Violet Laser Diode", Optical Data Storage, 2000. Conference Digest Whisler, BC, Canada. May 14-17, 2000, Piscataway, NJ, USA, IEEE, US, May 14, 2000, pp. 21-23, XP010500991.

Cideciyan, R. D., et al., "A PRML System for Digital Magnetic Recording", IEEE Journal on Selected Areas in Communications, IEEE Inc., New York, US, vol. 10, No. 1, 1992, pp. 38-56, XP000467626.

* cited by examiner

ARRANGEMENT FOR ADAPTIVE BIT RECOVERY

This application claims the benefit, under 35 U.S.C. §365 of International Application PCT/EP05/002070, filed Feb. 26, 2005, which was published in accordance with PCT Article 21(2) on Sep. 15, 2005 in English and which claims the benefit of European patent application No. 04005528.7, filed Mar. 9, 2004.

FIELD OF THE INVENTION

The present invention generally relates to an arrangement for adaptive bit recovery, and more specifically to an arrangement for adaptive bit recovery from an optical recording medium. It further relates to an apparatus for reading from and/or writing to recording media using such arrangement.

BACKGROUND OF THE INVENTION

Recently techniques have been developed for a channel adaptive recovery of data from optical recording media. However, due to the multitude of possible media types, e.g. Compact Disk, Digital Versatile Disk, Blu-ray Disk, and many other types, and the fact that some recording media types are not protected by a housing, a stronger monitoring of the adaptive processes is required. For this purpose several solutions were proposed to implement a reliable data retrieval processing. One solution is depicted in FIG. 1. A high frequency data stream HF captured from a recording medium is sampled and quantized in an analog-to-digital converter 1, resampled to the data channel clock rate by a sample rate converter 4, and fed to a bit recovery block 11 dealing with the channel adaptation. The channel clock for the resampling is recovered in a clock recovery block 10, which typically includes a phase locked loop 3 preceded by an equalizer 2. The data for this equalizer 2 is either received directly from the analog-to-digital converter 1 or as phase information from the bit recovery block 11. The obtained data and the clock are transmitted to a demodulator 9, which sends the demodulated data to error correction processing (to ECC).

The bit recovery block includes an adaptive equalizer 8 and an associated coefficient updating block 7, which uses the least mean square (LMS) algorithm and weights the output of the adaptive equalizer 8 with the recovered data after filtering by a target filter 5. Due to the increased intersymbol interference of current modulation schemes for channels of optical recording media a partial response maximum likelihood detector 6 is provided for detecting the most likely data from the incoming data stream. Since the channel modulation generally uses a run-length limited coding scheme it is common to employ a Viterbi decoder 6.

More recently it has been proposed to provide an adaptive Viterbi detector 14 as shown in FIG. 2. In this case, while monitoring the output of the Viterbi detector 15, i.e. the recovered data bits, the target values against which the likelihood of the possible data bit is measured are updated by a target value updating block 17. This is realized by comparing a best case value, i.e. the most likely value, with the data fed into the adaptive Viterbi decoder 15. A slicer 12 is provided for roughly eliminating DC components, which are not caused by the modulation but by data coupling. This is the digital counterpart of a decoupling capacitor trimmed for the lowest frequencies. The higher order DC component caused by the modulation changes on run-length time frames and is tackled in the equalizer 8. A state detector 16 follows the Trellis diagram of the Viterbi decoder 15 by monitoring the bit combinations. The Trellis diagram will be explained further below with reference to FIG. 9. For example, the subsequently detected bits '++−' (i.e. bit order '1 1 0' or state '4') only allow a transition to a following state '3'. From state '2' the transition may be to states '4' and '5'. If an invalid transition is detected in the target update block 17 this target is not updated with the value of the corresponding input sample, which should actually give a closer match to the correct signal.

However, adaptive processes tend to become unstable and counteractive under certain circumstances like initialization or when dealing with errors in the data stream caused by scratches or fingerprints. Therefore, it has been proposed to introduce an auxiliary detector 20 to improve the adaptation performance of the bit recovery block 11 under such conditions and to meet high speed data detection requirements. A scheme of such an arrangement is shown in FIG. 3. The auxiliary detector 20 includes a pre-equalizer 21, a data pre-slicer 22, a non-linear equalizer 23, and a bit detector 24. This auxiliary detector 20 basically slices the bit information out of the center of the resampled hf data. The detector 20 has certain limitations considering run-length dependent parasitic DC-components, and tends to misdetect the shorter run-length data bits. Nevertheless, the auxiliary detector 20 outperforms the Viterbi detector 14 when dealing with corrupted data regions on a recording medium and does not have the detection latency immanent to the filter length and path memory depth used in the Viterbi bit detection path 14. An event logic 25 as indicated in FIG. 3 decodes the data sample transition as above zero, zero or below zero and passes this information to the clock recovery block 10 (not shown here) together with the corresponding phase value.

When dealing with several types of recording media and channels (e.g. DVD+RW, DVD-RW etc.) a high degree of flexibility is required for the adaptation processes. Some flexibility can still only be provided by a system reconfiguration initiated by a host control, but some flexibility is already within the scope of hardware implementation, due to the increased integration level of very large scale integrated circuits (VLSI).

It is an object of the present invention to provide an improved arrangement for adaptive bit recovery allowing a reliable bit detection exceeding the performance of common data detection processors.

SUMMARY OF THE INVENTION

According to the invention, this object is achieved by an arrangement for adaptive bit recovery including an adaptive equalizer and an adaptive partial response maximum likelihood detector, which further includes enhanced control measures for the adaptive equalizer and/or the adaptive partial response maximum likelihood detector. Favorably the enhanced control measures include an overflow control block for the adaptive equalizer for monitoring at least one of the adaptation coefficients. If the equalizer is realized as a simplified finite impulse response (FIR) Volterra filter, the overflow control block advantageously monitors the Volterra coefficient. Basically this coefficient is treated as a measure for the signal asymmetry. However, if the jitter of the incoming data is too high, this coefficient might run out of the intended data range. In a more general approach the overflow control is expanded to all coefficients. In the case of overflow a scaling block applies a scaling to the coefficient paths based on an output signal of the overflow control block.

Favorably, the arrangement further includes means for obtaining phase information by comparing the highest absolute coefficient value with its coefficient number. A constant group delay caused by the filtering always gives the maximum coefficient value at the same position. For an optimum filter coefficient set the middle tap has the highest value. The obtained information is passed to a host control as a phase warning, for example as a flag indicating that the phase is on or off the optimum, or as a position identifier indicating the coefficient having the highest value.

According to a further aspect of the invention, the enhanced control measures include a control logic for an adaptation constant (MU) for a coefficient update weight. The coefficient update weight is favorably larger during the beginning of the adaptation process than during normal operation. Favorably the operation of the control logic is simplified and concentrates on only a few coefficients. The coefficients are filtered, e.g. by a mean time average filtering, and compared for finding the highest value. This might change during the adaptation process, therefore a locking to a single coefficient is necessary. This locking might be unlocked either by the host control or by a lock time counter. The speed of adaptation is monitored by analyzing the gradient of the coefficient transitions. Since noise may cause larger changes of the slope of the coefficient transitions an effective pre-filtering is advantageously performed. In dependence on the value of the detected gradient a scaling of the adaptation constant is performed. Another information obtained by the monitoring is the state of adaptation during run-in. A small value of the gradient implies that the coefficient values do not change much and, therefore, implies an almost stable adaptation.

According to still a further aspect of the invention, the enhanced control measures include a state violation checker for monitoring the allowed states and indicating state violations, and a noise detector for detecting larger deviations of the target values. The recovered data are generally mapped to the respective Trellis state with the aid of a look-up table. The state violation checker monitors the allowed state. As soon as an invalid entry of the look-up table appears an error indication is generated and the target value update is disabled. In addition the noise detection block monitors the target values to detect larger deviations. This monitoring is favorably simplified to the middle value. For the noise level check the middle target value of the selected partial response estimate is filtered, mainly to remove low frequency components like a spurious DC offset, and compared with given noise levels noise. Even if the adaptation has actually settled, the target value changes exhibit a large activity. The noise level is preferably transmitted to the host control as a noise warning and is used for controlling a scaling of the target value update to reduce the impact of input sample changes.

Advantageously, the enhanced control measures include a path memory and survivor control block for storing path decisions for each state and the most likely state. The path memory and survivor control block favorably includes an output checker for finding invalid bit transitions. These can occur, for example, due to a path switching when the noise level is too high to calculate accurate probabilities for the most likely path. The path decisions for each state and the most likely state are stored in the path memory and survivor control block, which includes a plurality of path memory cells. Each cell includes a memory for the selected path id, a path mapper and a 'next state'-state machine. The path mapper is basically a look-up table for all possible paths allowed by the relevant Trellis diagram. The 'next state'-state machine compares the incoming path id map with the offered minimum state to calculate the next state representing the next most likely minimum state. By building up a chain of path memory cells these operations are unrolled over the history of incoming data bit values. The output state of the last pm cell is translated into a most likely bit along this most likely Trellis path. At the output of the pm cells always valid states are found. The path along the Trellis diagram might change due to noise or data corruption, invalid bit sequences may occur. Therefore, the output checker stores a certain number of bits, depending on the minimum(maximum) run-length of the selected channel modulation, and flags the current bit as violation or as clean. A demodulator is then able to determine a proper bit replacement according to its demodulation scheme.

Favorably the generated error information is provided to further processing units for supporting data processing. For example, error locations can be indicated to the demodulation block or an error correction control.

Favorably, an arrangement for adaptive bit recovery according to the invention is used in an apparatus for reading from and/or writing to recording media.

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures:

Figure 4:
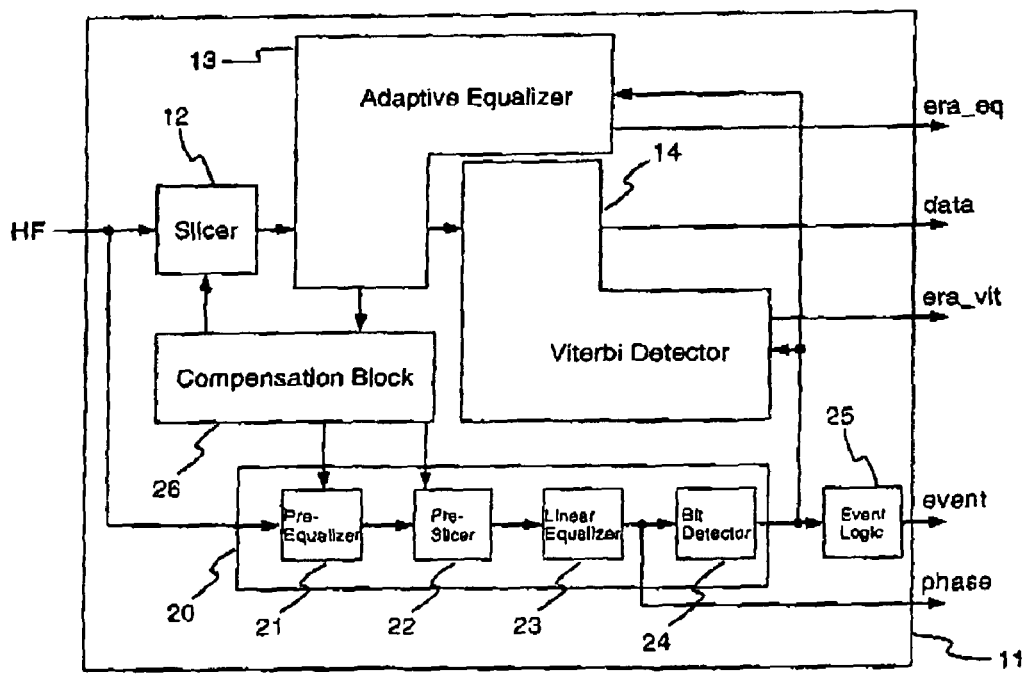
FIG. 4 depicts an exemplary embodiment of an arrangement for bit recovery according to the invention.

An exemplary embodiment of an arrangement according to the invention is depicted in FIG. 4. The circuit 11 includes a coarse asymmetry compensation block 26 and emits so called erasure flags era_eq, era_vit for indicating error locations to following processing stages like the demodulation block 9 or error correction control.

DETAILED DESCRIPTION OF PREFERRED EMBODIMENTS

Figure 1:
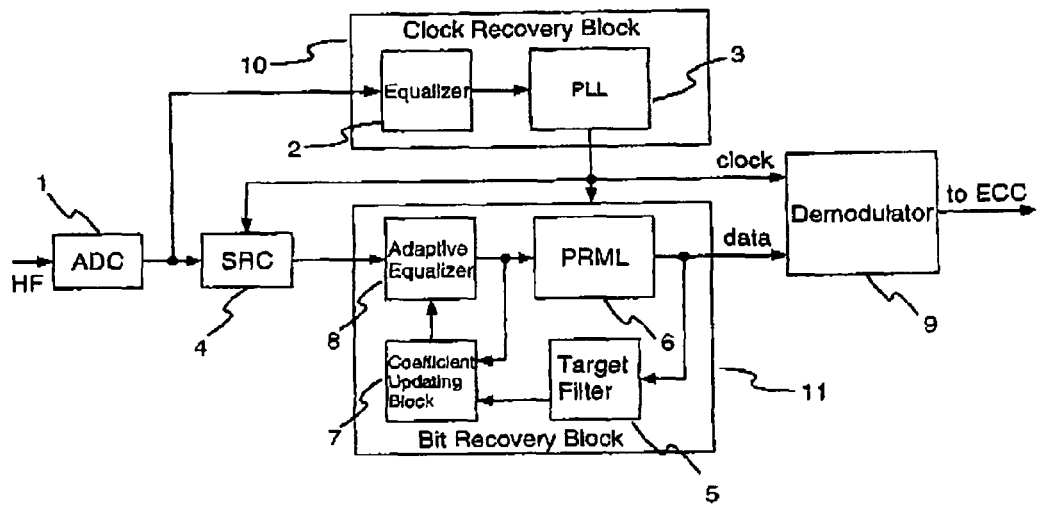
FIG. 1 shows a known arrangement for adaptive bit recovery.
Figure 2:
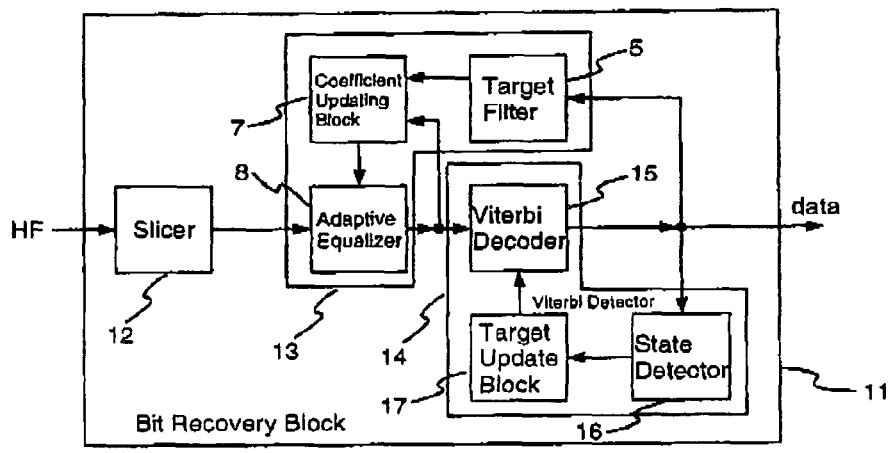
FIG. 2 schematically depicts an improved adaptive bit recovery block including an adaptive Viterbi decoder.
Figure 3:
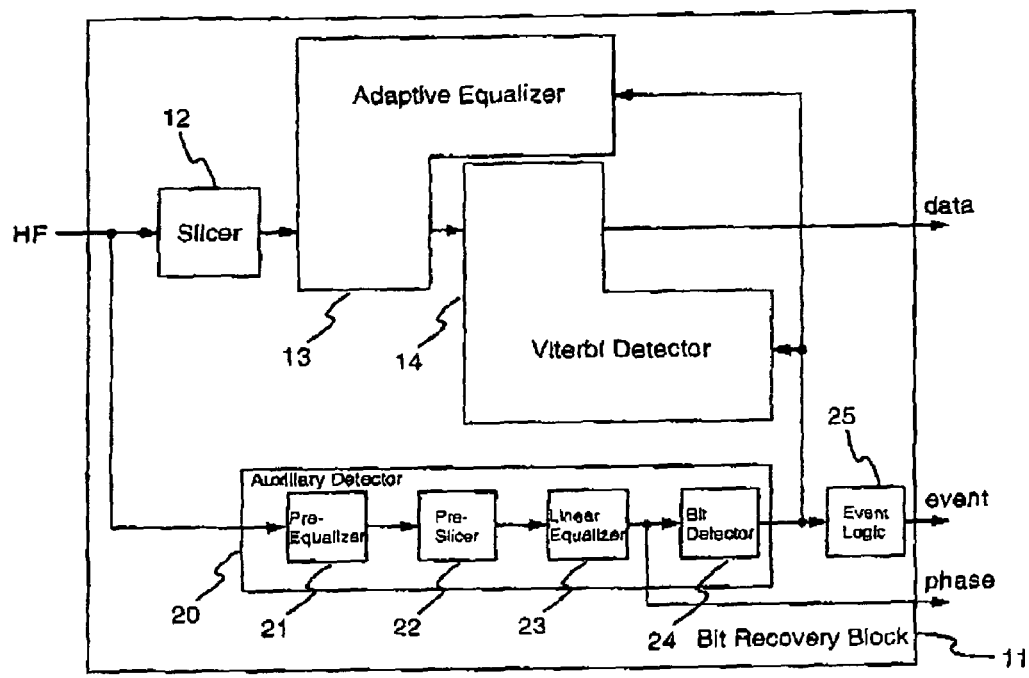
FIG. 3 shows a bit recovery block including a main and an auxiliary detector.
Figure 5:
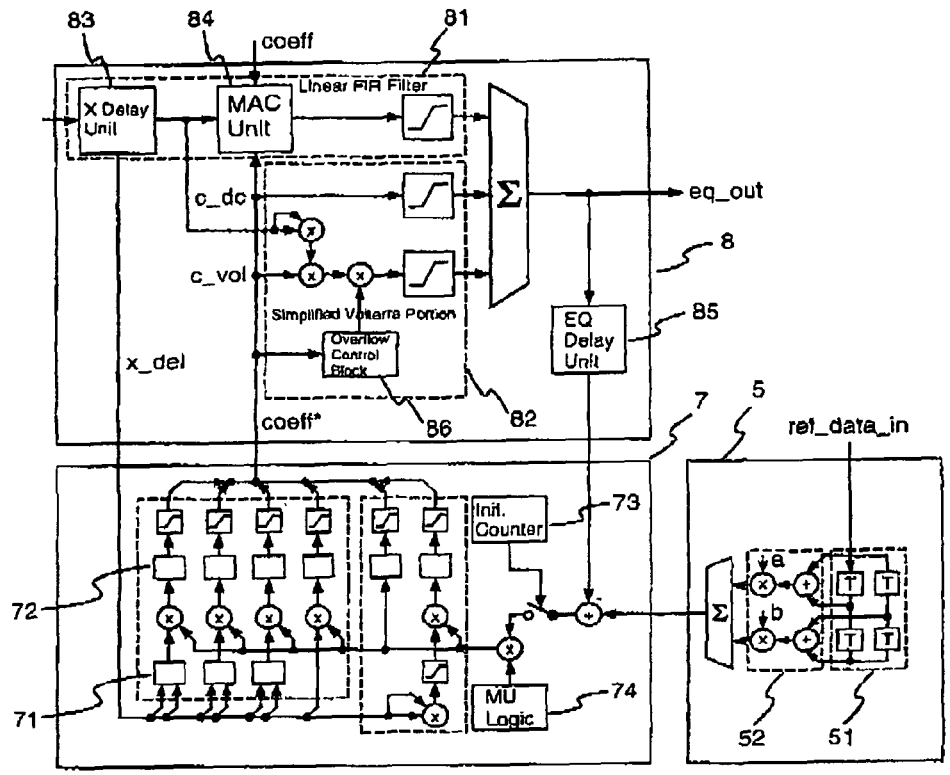
FIG. 5 shows a more detailed scheme of an adaptive equalizer.

A more detailed scheme of the adaptive equalizer 13 is shown in FIG. 5. The adaptive equalizer 13 is divided into the blocks equalizer 8, target filter 5, and least mean square (LMS) update 7, as depicted in FIG. 2. The equalizer 8 is realized as a simplified finite impulse response (FIR) Volterra filter following the basic formula $$y(n) = h_0 + \sum_{m_1=0}^{N_1-1} h_1(m_1) \cdot x(n-m_1) + \qquad (1)$$

$$\sum_{m_1=0}^{N_2-1} \sum_{m_2=0}^{N_2-1} h_2(m_1, m_2) \cdot x(n-m_2) \cdot x(n-m_1)$$

in which $h_0$ corresponds to the DC component, the second term to the linear FIR filter component, and the third term to a quadratic Volterra component. Higher order terms are neglected in this example. According to the implementation scheme this formula is simplified and the equalizer 8 is divided into a linear FIR portion 81 including an X delay unit 83 and a MAC (multiply-accumulate) unit 84, and a simplified Volterra portion 82 with $c\_dc = h_0$ and $c\_vol$ representing a quadratic filter coefficient $h_2(m_1,m_2)$. For this coefficient only the multiplication with the squared middle element of the filtered X-vector is required.

An example of a typical implementation shall be explained in the following. The linear FIR filter 81 includes a seven tap (N=7) filter with a symmetrical coefficient set. Therefore the filtering at time sample n=0 is:

N=7

$$y = eq\_out = c_0 \cdot x_0 + c_1 \cdot x_1 + c_2 \cdot x_2 + c_3 \cdot x_3 + c_2 \cdot x_4 + c_1 \cdot x_5 + c_0 \cdot x_6 \qquad (2)$$

This operation is divided into an X delay process performed by the X delay unit 83 and an add and multiply operation performed by the MAC unit 84. The X-vector element $x_3$ represents the hf input data at the group delay of the linear filter 81 and is squared and multiplied with the Volterra coefficient c_vol. It can be shown that the provision of an equalizer including such non-linear element improves the performance with regard to channel adaptation in the case of distortion by non-linear effects such as a run-length dependent DC offset caused by domain bloom, i.e. asymmetry.

For adapting the equalizer coefficients to the data channel a new set of coefficients is calculated in the LMS update block 7. Again the symmetric coefficient set allows a simplified implementation of the general LMS formula:

$$C_{new} = C_{old} + \mu \cdot \Sigma(tfout - eqout^*) \cdot x \qquad (3)$$

Basically the filtered feedback of the recovered data ref_data_in is compared with the equalizer output eq_out, weighted with an adaptation constant MU against the equalizer input x_del, and integrated in a set of accumulators 72. In order to reduce the number of filter coefficients some debasement is accepted by assuming a symmetrical filter. This in return allows to simplify the calculations. For this purpose averagers 71 are provided. The feedback filter (target filter) 5 is a linear FIR filter including a delay unit 51 and a MAC unit 52 and following a partial response estimate for the considered data channel. Usually this filter 5 is defined by stating the (symmetrical) filter coefficients PR(abba). For example, for DVD (digital versatile disk) PR(1111) and for BD (Blu-ray disk) PR(1221) are common.

In order to match the coefficients the equalizer output eq_out and the X-vector, i.e. the equalizer input, are delayed by the X delay unit 83 and an EQ delay unit 85, respectively.

To improve and support the adaptation and error handling behavior a run-in delay, an overflow control block 86 for the filter coefficients and a MU control logic 74 are provided, which shall be described in the following.

During run-in, i.e. after the start of data retrieval following a jump, the host control delays the start of adaptation to prevent lock-ups or confusion. Typically, after a rough channel estimation by the adaptive equalizer 13 the adaptation of the Viterbi decoder 15 is added. A loadable initialization counter 73 within the adaptive equalizer 13 simplifies the start/restart process. As an example, in FIG. 5 this initialization counter 73 is included in the LMS update block 7 of the adaptive equalizer 13.

The filter coefficients tend to change rapidly in the beginning of the adaptive process. Depending on the signal quality of the incoming hf data (Jitter, additive Noise etc.) the adaptivity might fail or might match to wrong phases. Basically the middle tap of the linear filter will have the highest absolute value. All deviations from this optimum give indications of signal quality and therefore the possible quality of bit recovery process.

In FIG. 5 an overflow control block 86 within the equalizer 8 monitors the Volterra coefficient (c_vol). Basically this coefficient is treated as a measure for the signal asymmetry. However, if the jitter of the incoming data is too high, this coefficient might run out of the intended data range. A typical implementation would be:

```
if (c_vol > 120)
    SCALE = 2;
else
    SCALE = 1;
end
```

Of course, the threshold value of 120 is only exemplary and has to be chosen in accordance with the actual implementation of the complete arrangement. The scaling is considered in the filter process, giving this coefficient a larger impact.

Figure 6:
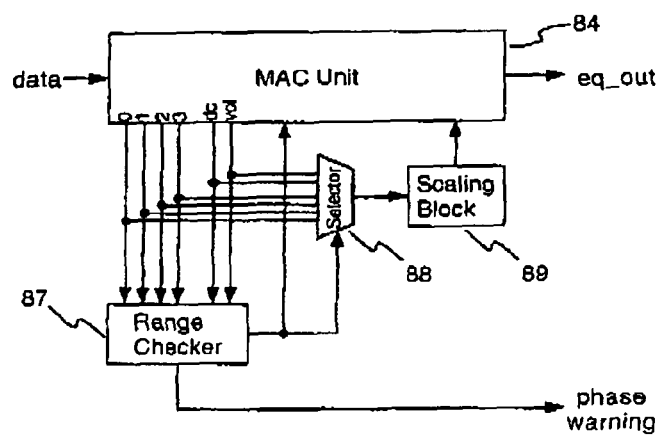
FIG. 6 illustrates the expansion of an overflow control to all filter coefficients.

In a more general approach the overflow control 86 is expanded to all coefficients, which is schematically illustrated in FIG. 6. The MAC unit 84, which includes the summations and multiplications for the Volterra coefficients, passes the coefficient values to a range checker 87. Depending on the overflow and the importance of a coefficient, which is selected by the range checker 87 via a selector 88, a scaling block 89 applies a scaling to the respective coefficient path in the MAC unit 84. The selection can, for example, be determined by register settings or based on the detected maximum values of the coefficients. In general the middle coefficient should have the largest value. If this is not the case a phase error is introduced and other coefficients have to be scaled. In FIG. 5 the scaling is indicated by the multiplier following the overflow control 86. In addition, phase information is favorably obtained by comparing the highest absolute coefficient value with its coefficient number. A constant group delay caused by the filtering always gives the maximum coefficient value at the same position. For an optimum filter coefficient set the middle tap has the highest value. The obtained information is passed to the host control as a phase warning either as a flag (e.g. PHASE OFF/ON OPTIMUM) or as a position identifier (COEFF0, COEFF1, COEFF2, COEFF3, ... ).

Figure 7:
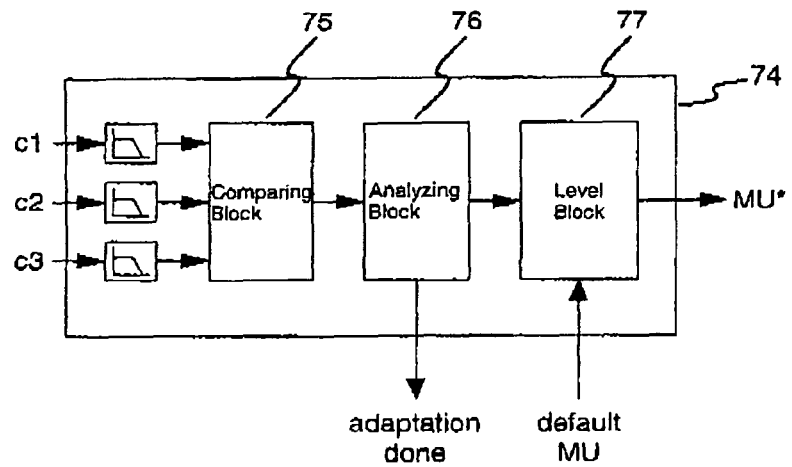
FIG. 7 shows an implementation of a MU logic.

The MU logic 74 in the LMS update block 7 is provided for the coefficient update weight, which is favorably larger during the beginning of the adaptation process than during normal operation. A possible implementation of the MU logic 74 is depicted in FIG. 7. The operation is simplified and concentrates on only a few coefficients. Typically the middle tap of the linear filter has the highest coefficient value. In the symmetric seven tap example this is the coefficient c3. A noise free adaptation has the odd numbered coefficient as the next highest value, but due to the possibility of phase distortion it might also be c2. The coefficient locations in the filter and LMS operation are indicated above in equation (2).

The coefficients are filtered, e.g. by a mean time average filtering, and compared by a comparing block 75 to find the highest value. Since this might change during the adaptation process, a locking to a single coefficient is required, which can be unlocked either by the host control or by a lock time counter.

By analyzing the gradient of the coefficient transitions the speed of adaptation is monitored. Since noise may cause larger changes of the slope of the coefficient transitions an effective pre-filtering is advantageously performed. A simple implementation of a gradient analyzing block 76 for finding the gradient includes a delay line and a subtraction:

$$\text{grad}=\text{coeff\_in}-\text{coeff\_in\_delayed} \quad (4)$$

In dependence on the value of the detected gradient a MU scaling is performed by a set level block 77:

```
if (grad > 20)
    MU = 1000;
else
    MU = 100;
end
``` given that the LMS weight is done by a division by a large number and therefore actually represents 1/m. Of course, the above values are only exemplary values. Bit shifts such as multiplications result in MU values around '8' depending on the bitwidth used in the LMS update operation.

Another information obtained by the monitoring is the state of adaptation during run-in. A small value of the gradient implies that the coefficient values do not change much and, therefore, implies an almost stable adaptation.

As a second adaptation process in the arrangement for bit recovery discussed here, the Viterbi decoder 15 includes means comparable to the overflow control 86 or the MU logic 74. Details are discussed in the following.

Figure 8:
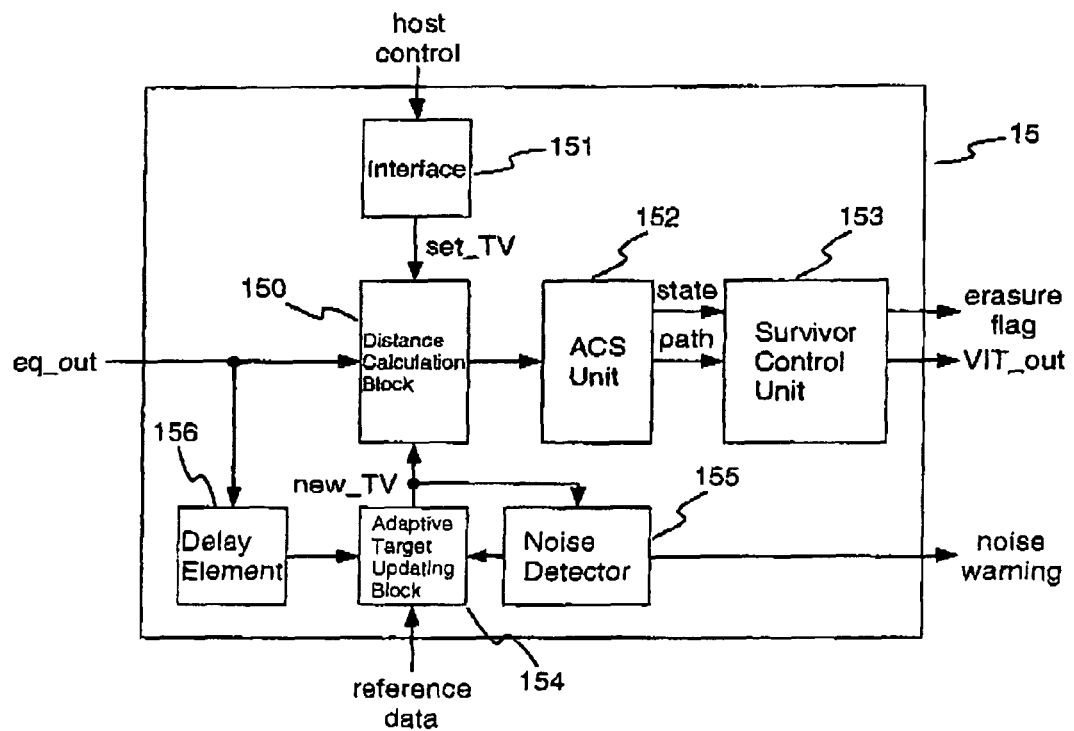
FIG. 8 depicts an outline of an adaptive Viterbi decoder.

FIG. 8 depicts an outline of the adaptive Viterbi decoder 15. A Viterbi decoder is built up on the assumption that only certain transitions of bit levels are possible due to the given run-length limitation of the data channel modulation. These bit levels are compared with a partial response estimate of this channel. This partial response estimate does not represent the perfect representation of the channel, but allows to add enough noise margin to distinguish between bit value transitions even when dealing with data streams affected by a large amount of intersymbol interference (ISI). Due to their different modulations different partial response estimates are used for DVD and BD.

The Viterbi decoder 15 in FIG. 8 realizes a soft decision scheme by comparing the squared difference (Euclidian distance) obtained by a distance calculation block 150 with the so-called target values of the selected partial response polynomial. In order to be able to reconfigure the Viterbi decoder 15 to the corresponding data channel an interface 151 to the host controller allows an initialization upon start-up.

Figure 9:
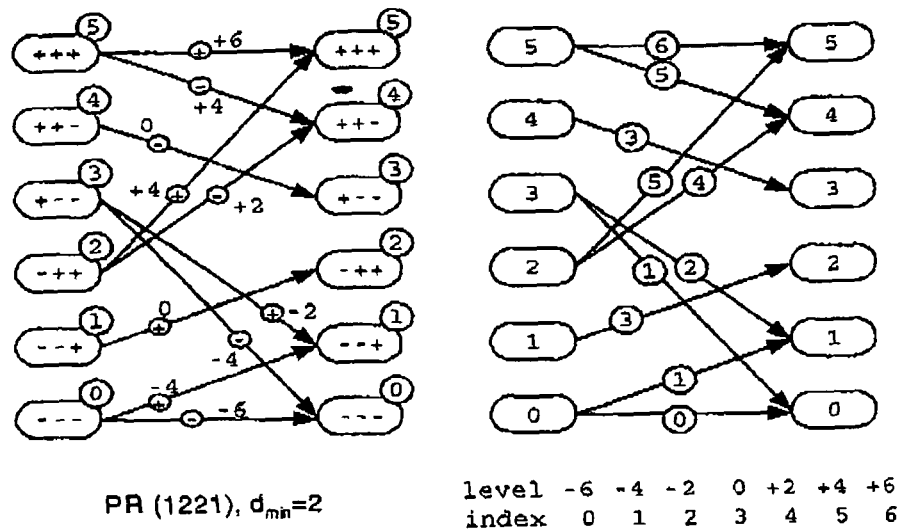
FIG. 9 illustrates a Trellis diagram for PR(1221) and a run-length limit of '2'.

An add-compare-select (ACS) unit 152 adds up the squared differences and compares the results along the possible transition paths. A diagram of such a scheme, which is known as Trellis diagram, is shown in FIG. 9 at the example of a BD Trellis diagram with run-length limit '2'. Valid states are indicated as sequences of '+' and '−' representing '0' and '1' in a bit stream. All allowed transitions to other states for the next bit transmission are along the indicated lines in dependence on the type of transition.

The ACS unit 152 maintains, therefore, a set of states and state value differences to the current incoming data value. The minimum distance to the data value gives the most likely transition. The state with the smallest value represents the survivor path and is stored in a path memory and survivor control unit 153. Since the optimum distance is not found during the first bit transmissions a set of states and paths is kept. A typical value for the depth of storage is '15'.

As an example of a Trellis diagram consider for an overall value range (+128, . . . , −128) a data value sequence '120, 120,120' resulting in the state '+++' (or state ID 5). A following data value of '100' causes a transition to either state 4 or state 5 (Path ID 5 or 6). The partial response for BD is selected as PR(1221), i.e. the coefficients for the respective partial response value are 1, 2, 2 and 1. Feeding a sequence of '1's and '0's to the partial response filter can only result in certain output values. In the case of '+1' as bit '1' and '−1' as bit '0' the possible target values are given in FIG. 9 as '−6, −4, −2, 0, +2, +4, +6'.

Example 1:
PR(1221), data sequence 1110→1×(+1)+2×(+1)+2×(+1)+1×(−1)=+4
The most likely next state for this transition is, therefore, state '4'.

Example 2:
PR(1221), data input 120,120,120,100 with the assumption that the first three bits are already detected and the provision to scale the partial response sequence output to a range from +128 to −128.
Target Value:
not scaled: −6 −4 −2 0 +2 +4 +6.
scaled: −102 −68 −34 0 +34 +68 +102
path 5: 120×(102)+120×(102)+120×(102)+100×(68)
path 6: 120×(102)+120×(102)+120×(102)+100×(102)
The value of the next state is given by the minimum path value added to the current state value. For state '5', therefore, two paths are possible and so on. The state with the smallest value is the most likely next state. Therefore, a decoder just needs to know this state to distinguish the most likely bit.

Returning to FIG. 8, since the path memory and survivor control unit 153 needs to store the path each path has got an ID. As only four different path decisions are required in the Trellis diagram the storage of binary digits for each required selection is sufficient. Therefore, four signals of path ID values contain basically binary digits to distinguish the path. This will be discussed further below.

To accomplish adaptation in the Viterbi decoder 15 in a target value updating block 154 updates for the target values are calculated. These updates are derived from the partial response estimate based on the data detection history and the incoming equalized data stream eq_out delayed by a delay element 156.

In order to improve the performance of the arrangement for bit recovery during processing of erroneous data patterns a state violation checker 162, a noise detector 155, and a bit decode control are provided. These blocks are discussed in detail in the following.

Figure 10:
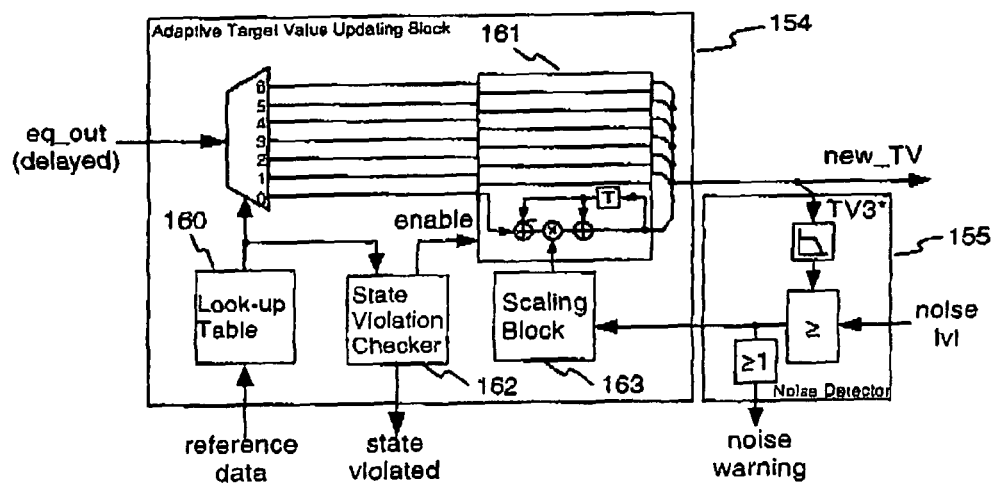
FIG. 10 shows an implementation of an adaptive target value updating block.

FIG. 10 shows a possible implementation of the adaptive target value updating block 154. The recovered data (reference data) are mapped to the respective Trellis state with the aid of a look-up table 160. The corresponding input sample of the Viterbi decoder 15, i.e. the delayed eq_out, is passed to an integration array 161 recalculating just this addressed target value. The integration is favorably implemented in the form $$TV_{new}=TV_{old}+C\times(TV_{old}-TV_{new}) \quad (5)$$

with C as an integration constant. The state violation checker 162 monitors the allowed state. As soon as an invalid entry of the look-up table 160 comes up an error indication is generated (state violated) and the target value update is disabled.

In addition the noise detection block 155 monitors the target values to detect larger deviations. In the figure this monitoring is simplified to the middle value TV3*. For this purpose it has to be ensured that the main adaptation process has already ended or that the gradient of adaptation is known. If it is assumed that the slice level is settled (cf. slicer 12 in FIG. 4) and the equalizer 13 has settled adaptation ('adaptation done' in FIG. 7) according to a preferable implementation a noise level check by a noise level checker 155 is initiated as indicated in FIG. 10.

Figure 11:
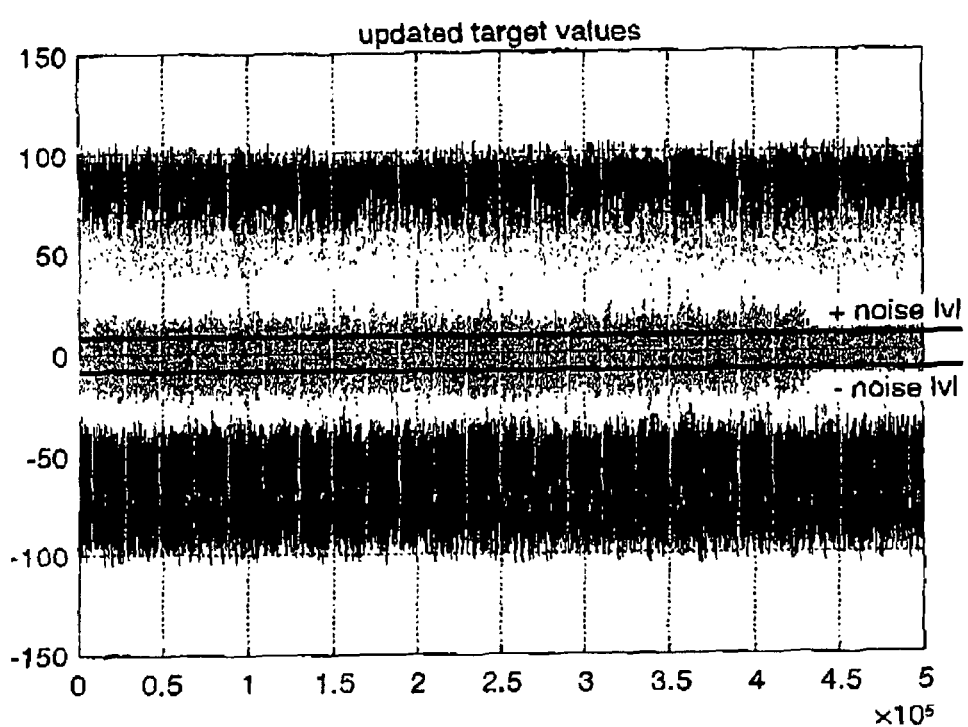
FIG. 11 depicts the changes of the target values against the input data samples.

For the noise level check the middle target value TV3* of the selected partial response estimate is filtered, mainly to remove low frequency components like a spurious DC offset, and compared with given noise levels noise lvl. A typical noisy case is shown in FIG. 11. Depicted are the changes of the target values against the number of input data samples. As can be seen, though the adaptation has actually settled, the target value changes exhibit a large activity. The noise level is preferably transmitted to the host control as a noise warning and is used to control a scaling of the target value update by a scaling block 163 to reduce the impact of input sample changes. This is, for example, achieved by reducing the integration constant of the integration array 161.

Figure 12:
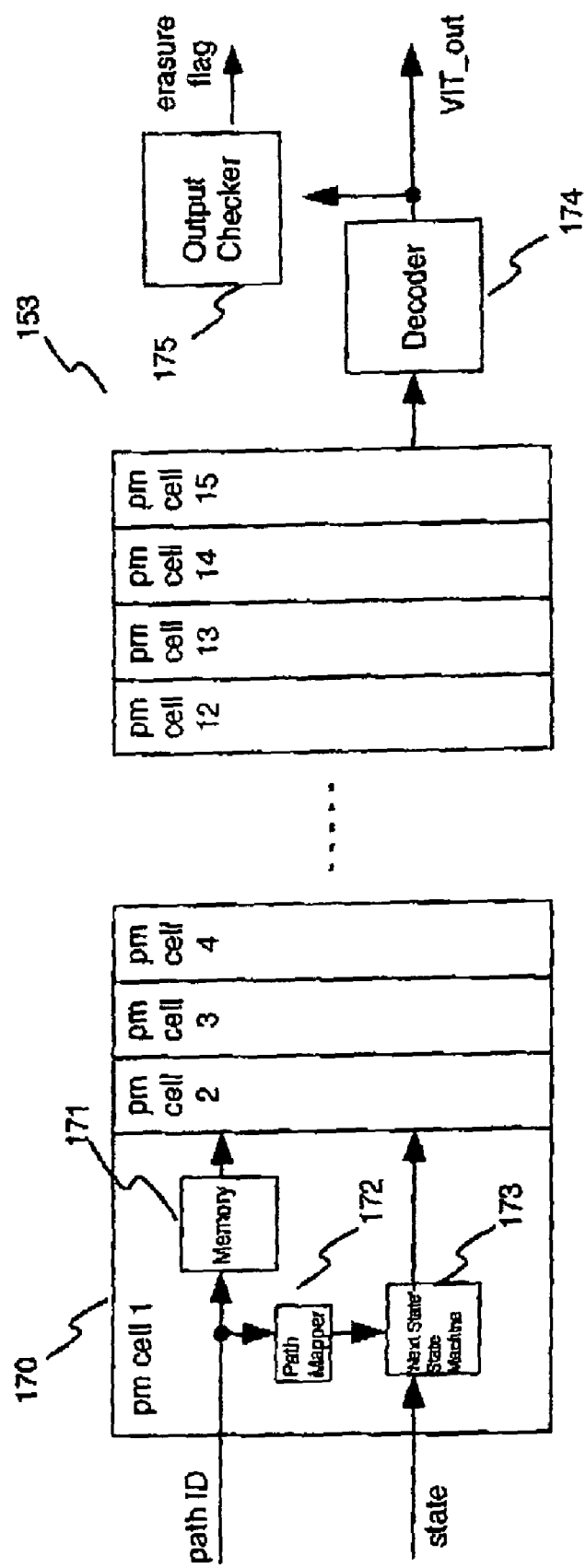
FIG. 12 shows an implementation of a math memory and survivor control block.

In FIG. 12 the path memory and survivor control block 153 is shown. The block 153 includes an output checker 175 for finding invalid bit transitions due to a path switching when the noise level is too high to calculate accurate probabilities for the most likely path.

The soft decision of the Viterbi decoder 15 stores the path decisions for each state and the most likely state in the path memory and survivor control block 153. The first stage is shown as 'pm cell 1' 170 and includes a memory 171 for the selected path id, a path mapper 172 and a 'next state'-state machine 173. The path mapper 172 is basically a look-up table for all possible paths shown in the Trellis diagram of FIG. 9. Some state transition paths do not need an extra path ID and consequently additional memory 171, since only a single option is possible. Such a case is, for example, the transition path from state '4' to state '3'. The 'next state'-state machine 173 compares the incoming path id map with the offered minimum state to calculate the next state representing the next most likely minimum state. By building up a chain of path memory cells these operations are unrolled over the history of incoming data bit values. The output state of the last pm cell is translated into a most likely bit along this most likely Trellis path. In this way a state '4' would directly translate into a '−1' (i.e. '0') and a state '5' into a '+1' (i.e. '1').

At the output of the pm cells always valid states are found. Since only the states are stored, i.e. '0, 1, 2, 3, 4, 5', a decoder 174 is provided for the transcription of the states into a bit stream. Since the path along the Trellis diagram might change due to noise or data corruption, invalid bit sequences may occur. Therefore, for BD the output checker 175 stores three (nine) bits, depending on the minimum(maximum) runlength of the selected channel modulation, and flags the current bit being fed to the demodulator 9 as violation (erasure flag set) or as clean (erasure flag cleared). The demodulator 9 is then able to determine a proper bit replacement according to its demodulation scheme.

The invention claimed is:

1. Arrangement for adaptive bit recovery, comprising:
   an adaptive equalizer;
   an adaptive partial response maximum likelihood detector;
   an overflow control block for the adaptive equalizer for monitoring one or more adaptation coefficients; and
   a scaling block for applying a scaling to one or more data paths of the coefficients when the overflow control block indicates that one or more of the coefficients is out of an intended data range, wherein the scaling is applied such that a middle coefficient has the highest value.

2. Arrangement according to claim 1, further including means for obtaining phase information by comparing a highest absolute coefficient value with its coefficient number.

3. Arrangement according to claim 1, further including a control logic for an adaptation constant for a tap value update for the coefficients.

4. Arrangement according to claim 3, further including a gradient analyzing block for analyzing a gradient of the coefficient transitions for monitoring the speed of adaptation.

5. Arrangement according to claim 4, further including a set level block for performing an adaptation coefficient scaling in dependence on the value of the detected gradient.

6. Arrangement according to claim 1, wherein generated error information is provided to processing units for supporting data processing.

7. Apparatus for reading from and/or writing to recording media, wherein it includes an arrangement according to claim 1 for adaptive bit recovery.

* * * * *